United States Patent [19]

Egawa et al.

[11] Patent Number: 5,572,256
[45] Date of Patent: Nov. 5, 1996

[54] SOLID-STATE IMAGING APPARATUS

[75] Inventors: Yoshitaka Egawa, Kawasaki; Yukio Endo, Yokohama; Yoshiyuki Matsunaga, Kamakura, all of Japan

[73] Assignee: Kabushiki Kaisha Toshiba, Kawasaki, Japan

[21] Appl. No.: 275,748

[22] Filed: Jul. 20, 1994

[30] Foreign Application Priority Data

Jul. 20, 1993 [JP] Japan .................................. 5-179272

[51] Int. Cl.$^6$ .................................................. H04N 5/335
[52] U.S. Cl. ........................ 348/296; 348/312; 348/317; 348/674
[58] Field of Search ..................................... 348/296, 297, 348/229, 221, 230, 224, 242, 277, 674, 678, 497

[56] References Cited

U.S. PATENT DOCUMENTS

| | | | |
|---|---|---|---|
| 4,489,349 | 12/1984 | Okada | 348/674 |
| 4,521,803 | 6/1985 | Gittinger | 348/430 |
| 4,768,084 | 8/1988 | Noda et al. | 348/277 |
| 5,089,890 | 2/1992 | Takayama | 348/497 |
| 5,162,902 | 11/1992 | Bell et al. | 348/678 |
| 5,264,944 | 11/1993 | Takemura | 358/335 |
| 5,295,001 | 3/1994 | Takahashi | 358/482 |
| 5,438,365 | 8/1995 | Yamashita et al. | 348/297 |

OTHER PUBLICATIONS

IEEE Transactions on Electron Devices, vol. ED–32, No. 8, Aug. 1985, pp. 1511–1513 *A Photoelectric Conversion–Characteristic Control Method for Interline Transfer CCD Imager.*

Primary Examiner—Wendy Garber
Assistant Examiner—Andrew B. Christensen
Attorney, Agent, or Firm—Oblon, Spivak, McClelland, Maier & Neustadt, P.C.

[57] ABSTRACT

A solid-state imaging apparatus which effects an electronic shutter operation comprises a solid-state imaging device made up of a plurality of photosensitive pixels arranged in a matrix on a semiconductor substrate, a driving circuit for driving the solid-state imaging device and also controlling the photoelectric conversion time of the photosensitive pixel, a vertical CCD for clipping a first signal obtained during a longer photoelectric conversion time in the solid-state imaging device, at a specified level or above, and then adding the clipped signal to a second signal obtained during a shorter photoelectric conversion time, and a signal processing circuit for amplifying and outputting the added signal, and setting an amplification degree for the second signal to a value larger than an amplification factor for the first signal.

19 Claims, 9 Drawing Sheets

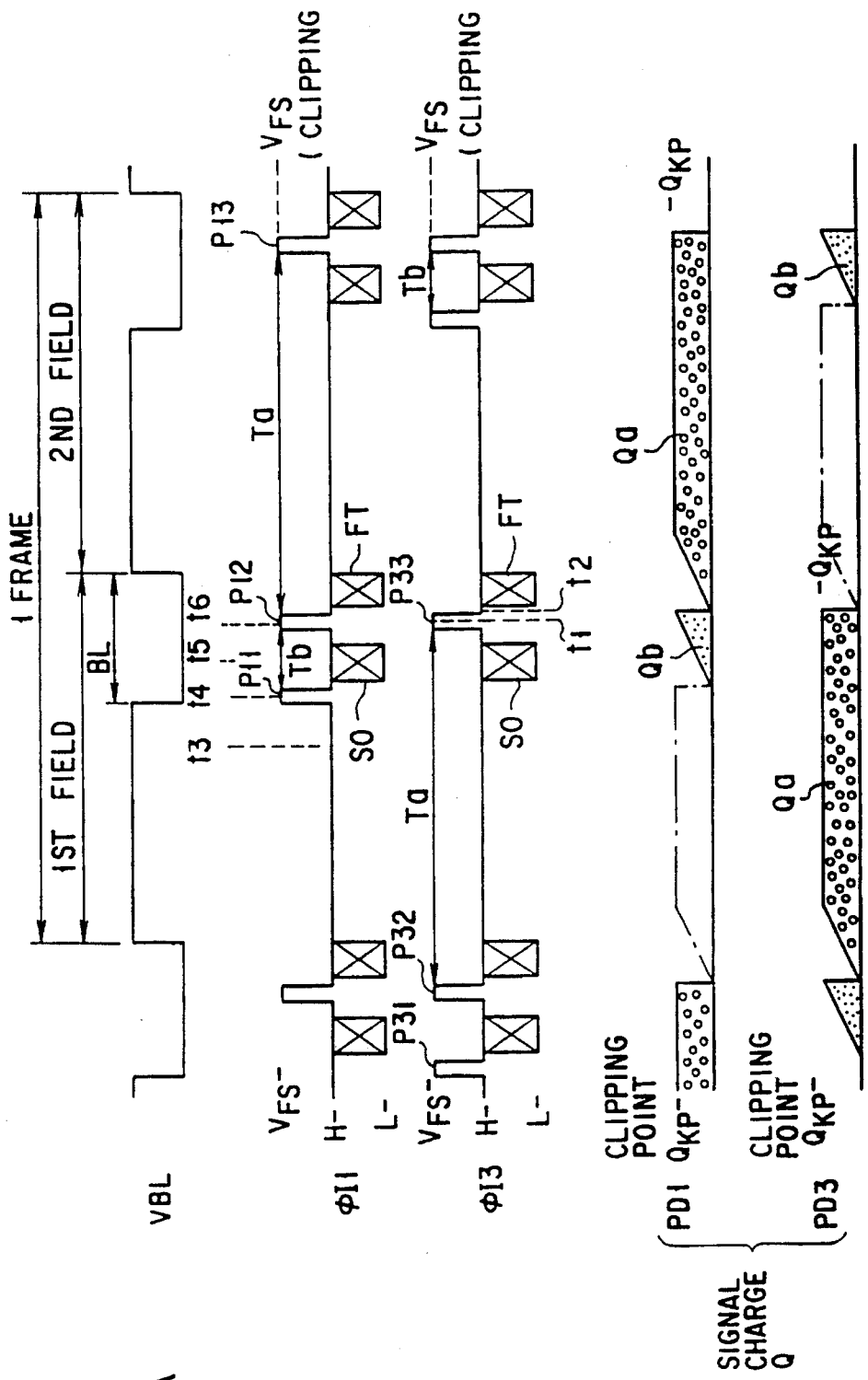

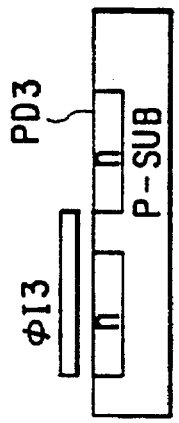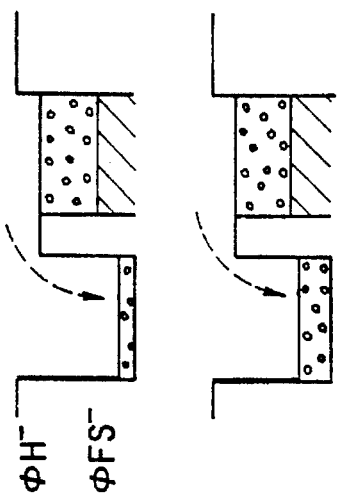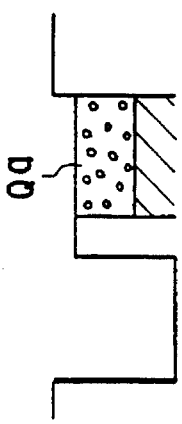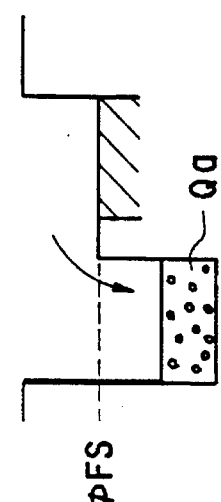
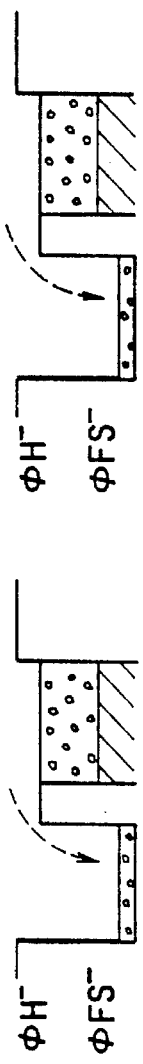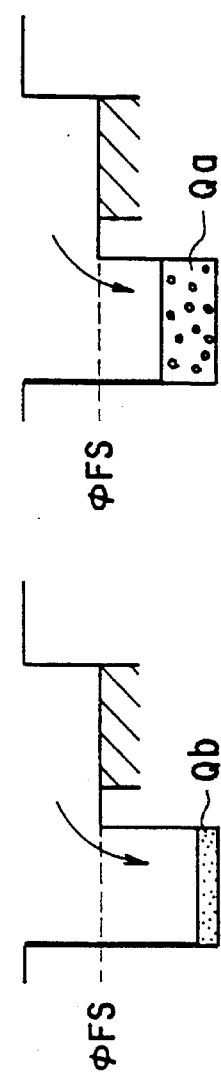
F I G. 3A   F I G. 3B   F I G. 3C   F I G. 3D   F I G. 3E FIG. 4A
1ST FIELD
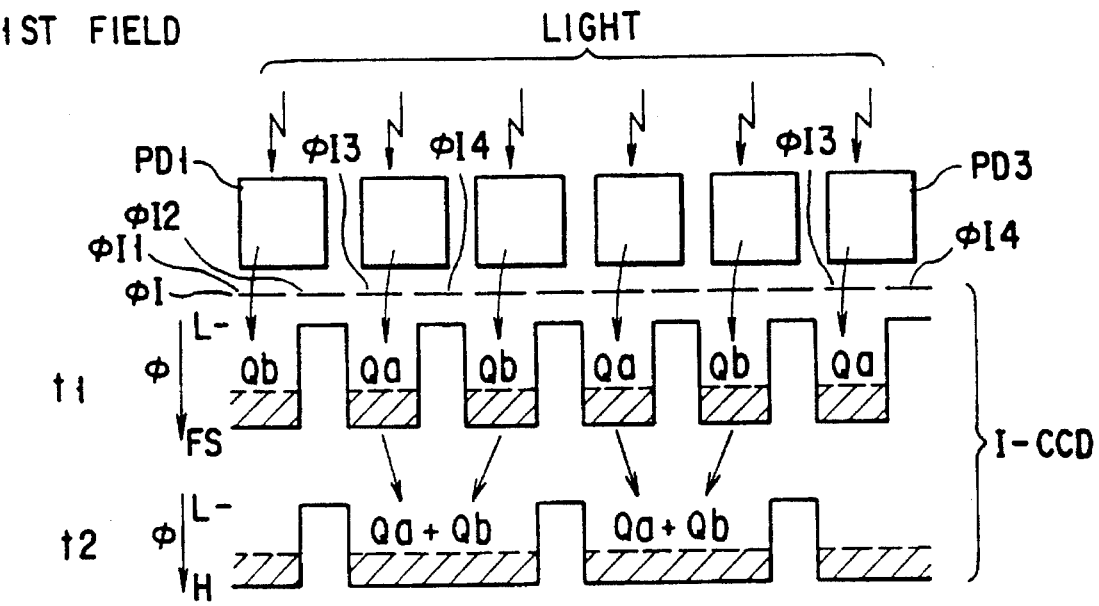
FIG. 4B
FIG. 4C
2ND FIELD
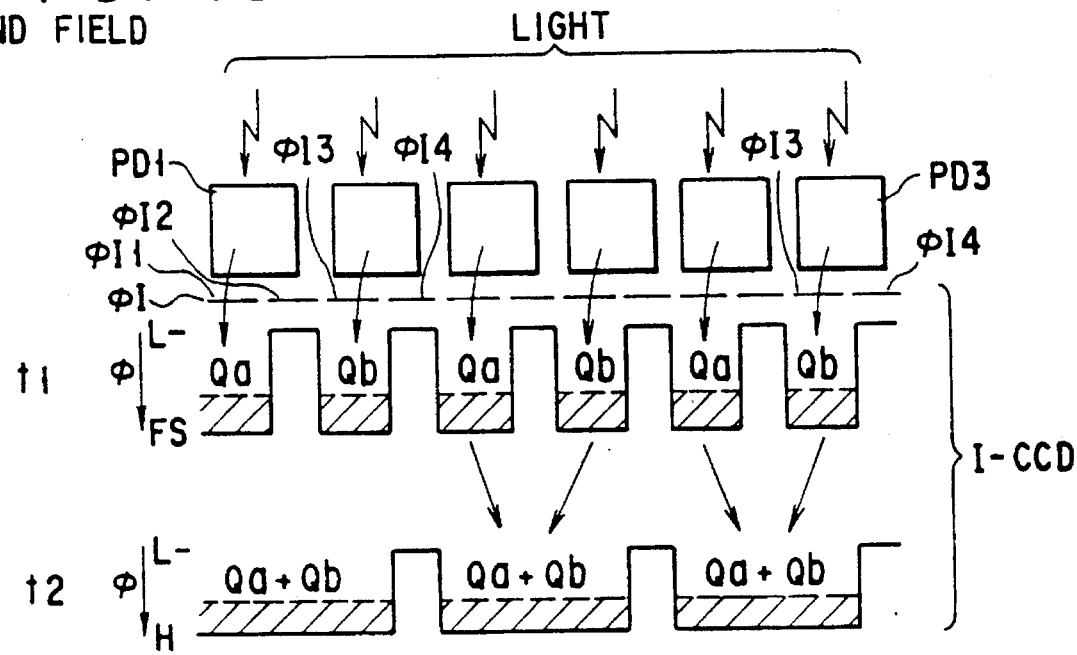
FIG. 4D

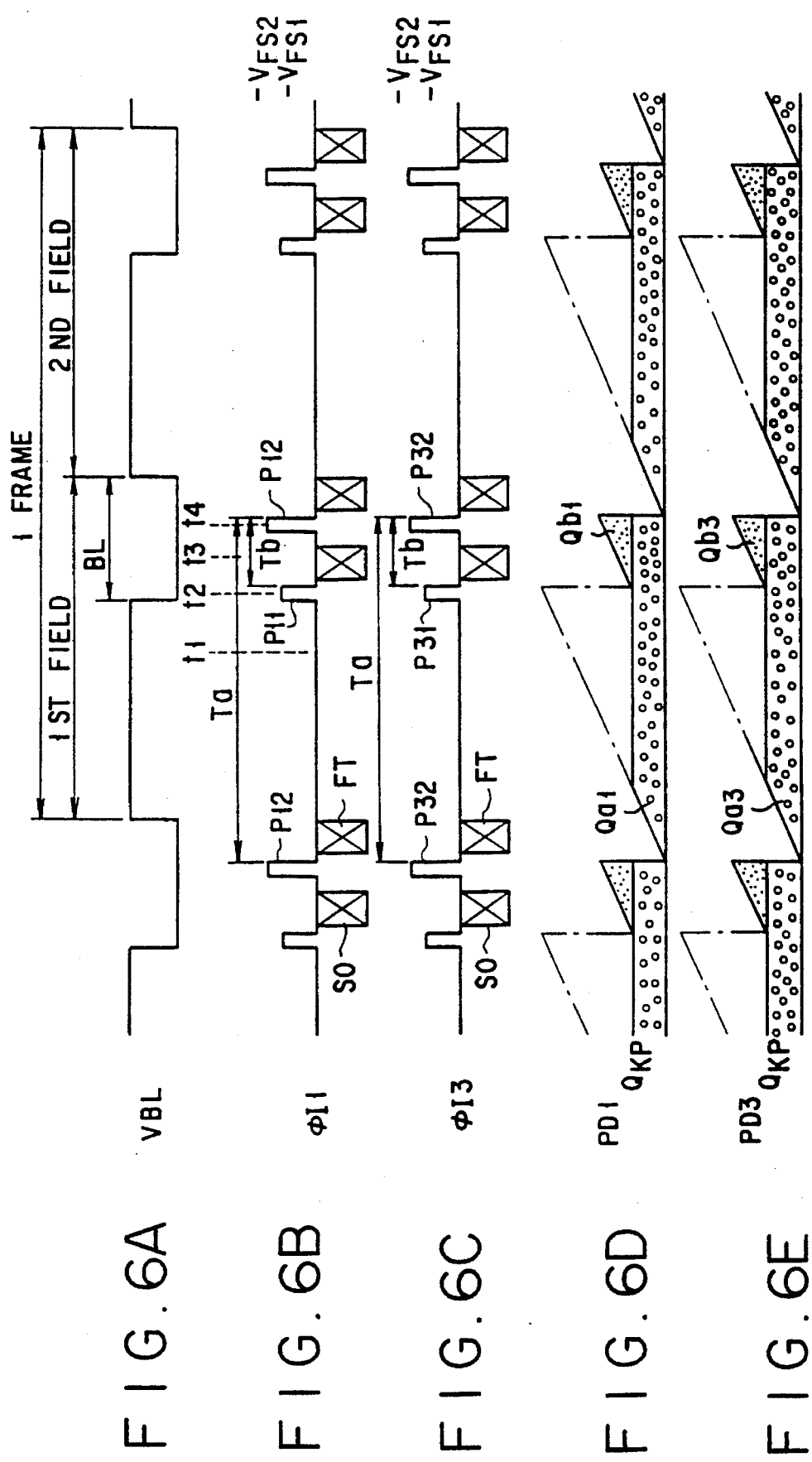

F I G. 7A
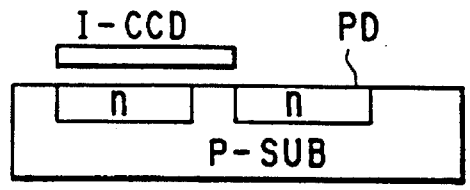
OPERATION AT t1
F I G. 7B
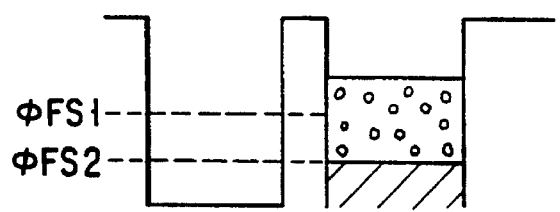
OPERATION AT t2
F I G. 7C
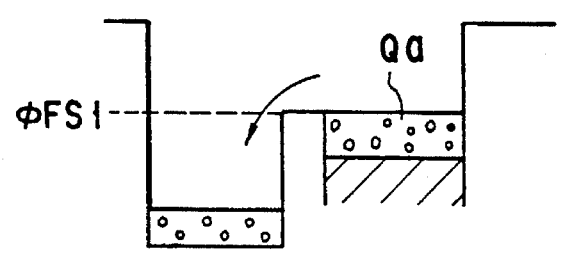
OPERATION AT t3
F I G. 7D
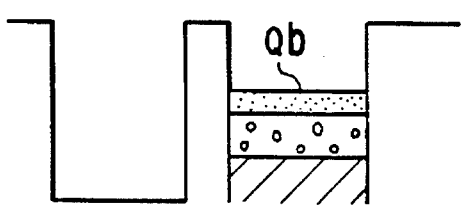
OPERATION AT t4
F I G. 7E
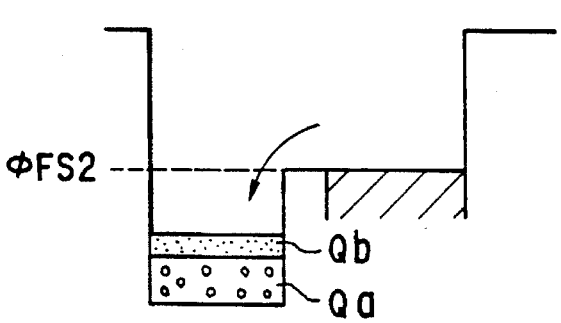

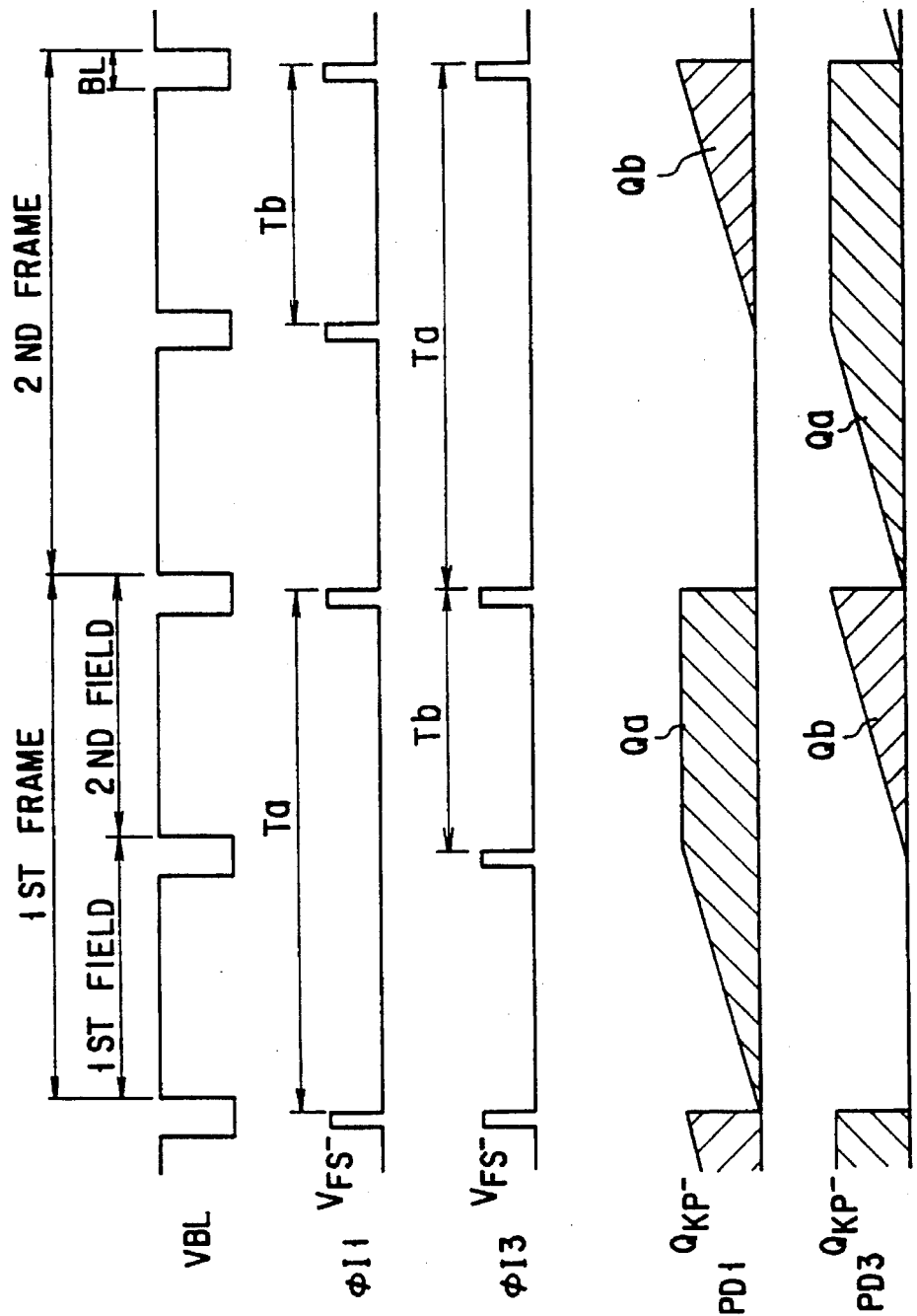

SOLID-STATE IMAGING APPARATUS

BACKGROUND OF THE INVENTION

1. Field of the Invention

This invention relates to a solid-state imaging apparatus, and more particularly to a solid-state imaging apparatus with a solid-state imaging device having an improved signal processing portion which performs an electronic shutter operation.

2. Description of the Related Art

Solid-state imaging devices using CCDs (charge-coupled devices) have many features including compactness, lightweight, high reliability, and easy maintenance and are applied to a wide variety of electronic cameras. Recently, solid-state imaging devices for high-definition television (HD-TV) camera have been developed and put to practical use.

With the HD-TV camera, high-definition images are produced on a multi-pixel wide screen (an aspect ratio of 9:16), so that when a moving subject is picked up with the HD-TV camera, the motion resolution deteriorates seriously owing to a time (photoelectric conversion time) during which the photosignal detected by the imaging apparatus is converted to an electric signal and stored in a pixel, degrading the quality of the picture significantly. To overcome this shortcoming, an electronic shutter operation has been applied which varies the photoelectric conversion time of photosensitive pixels on the solid-state imaging device. Nevertheless, in an electronic shutter operation, since the photoelectric conversion time is short, the amount of signals decreases, causing the problem of degrading the signal-to-noise ratio. Hereinafter, this problem will be explained briefly.

In a standard operation of the HDTV system, the photoelectric conversion time of the photosensitive pixels of the imaging device is determined to be $\frac{1}{60}$ sec. When the subject moves over the area of a single pixel during this time, the moving subject results in a blurred image, degrading the motion resolution. To overcome this drawback, an electronic shutter operation is effected with a photoelectric conversion time of, for example, $\frac{1}{600}$ sec (normally, the time may vary from $\frac{1}{125}$ to $\frac{1}{1000}$ sec). In this case, since the photoelectric conversion time is $\frac{1}{10}$ sec and therefore the amount of signals is as small as $\frac{1}{10}$, the signal-to-noise ratio is seriously degraded.

As mentioned above, in the standard operation of present-day television cameras, when a moving subject is picked up, the deterioration of the motion resolution takes place, degrading the quality of the picture significantly. Particularly, since a next-generation HD-TV camera produces high-definition images on a wide screen, this further degrades the picture quality due to the deterioration of the motion resolution. To overcome this problem, an electronic shutter operation as an option mode can be considered. This approach, however, introduces problems including an increase in noise as a result of an increased gain due to a decrease in the sensitivity and a decreased focussing depth as a result of opening the diaphragm.

SUMMARY OF THE INVENTION

The object of the present invention is to provide a solid-state imaging device capable of improving the motion resolution without degrading the signal-to-noise ratio and thereby creating high-quality reproduced images.

According to the present invention, there is provided a solid-state imaging apparatus comprising:

a solid-state imaging device including a plurality of photosensitive pixels arranged in a matrix on a semiconductor substrate;

a driving circuit for driving the photosensitive pixels of the solid-state imaging device during first and second photoelectric conversion times to obtain a first signal corresponding to the first photoelectric conversion time and a second signal corresponding to the second photoelectric conversion time shorter than the first photoelectric conversion time;

means for clipping the first signal corresponding to the first photoelectric conversion time at a specified level or above, and adding the signal obtained from the clipping to the second signal corresponding to the second photoelectric conversion time to produce an added signal; and a signal processing circuit for setting the amplification degree for the second signal larger than that for the first signal, amplifying the added signal from the adding means, and outputting the amplified signal.

Furthermore, according to the present invention, there is provided a solid-state imaging apparatus comprising:

a solid-state imaging device including a plurality of photosensitive pixels arranged in a matrix on a semiconductor substrate;

a driving circuit for driving the photosensitive pixels of the solid-state imaging device during first and second photoelectric conversion times to obtain a first signal corresponding to the first photoelectric conversion time and a second signal corresponding to the second photoelectric conversion time shorter than the first photoelectric conversion time;

means for clipping the first signal corresponding to the first photoelectric conversion time at a specified level or above, and adding the signal obtained from the clipping to the second signal corresponding to the second photoelectric conversion time to produce an added signal; and a signal processing circuit for setting at least one of a plurality of amplification degrees for the second signal larger than that for the first signal so that the amplification degree may decrease consecutively as the level of the added signal increases, amplifying the added signal from the adding means, and outputting the amplified signal.

Additionally, according to the invention, there is provided a solid-state imaging apparatus where a solid-state imaging device operates in field periods and alternately outputs signals whose photoelectric conversion time is long and signals whose photoelectric conversion time is short.

In addition, according to the invention, there is provided a solid-state imaging apparatus where a solid-state imaging device operates in field periods and outputs signals whose photoelectric conversion time is long and signals whose photoelectric conversion time is short in each field.

According to the invention, there is provided a solid-state imaging apparatus where a solid-state imaging device operates in sets of field periods and alternately outputs signals whose photoelectric conversion time is long and signals whose photoelectric conversion time is short in each set of fields. For example, when two fields make up one frame, a signal accumulated during one field period and a signal accumulated during two field periods are outputted alternately in each frame.

According to the invention, there is provided a solid-state imaging apparatus where a solid-state imaging device contains means for adding the signals of two adjacent pixels in the vertical direction, each pixel alternately producing a signal whose photoelectric conversion time is long and one whose photoelectric conversion time is short field by field, and adjacent pixels whose signals are to be added having different photoelectric conversion times.

With the present invention, because an electronic shutter operation is effected in driving the solid-state imaging element, the deterioration of the motion resolution occurring when a moving subject is shot can be prevented. When the amplification degree for signals obtained by a long photoelectric conversion time is set at the same valve as a standard operation in the signal processing at the solid-state imaging device, small signal level noise conspicuous on the reproduced image on the monitor is suppressed, thereby preventing the signal-to-noise ratio from deteriorating. Namely, as opposed to a conventional shutter operation, the motion resolution can be improved without degrading the signal-to-noise ratio, thereby producing a higher-quality reproduced image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a timing chart to help explain the operation of the solid-state imaging apparatus of the first embodiment;

FIGS. 3A to 3E show the structure of a pixel of an FIT-CCD and the potential, helping explain a clipping operation in the first embodiment;

FIG. 4 illustrates potential ø at the I-CCD portion and the signal charges Q converted photoelectrically by the photosensitive pixels PD;

FIG. 6 is a timing chart to help explain the operation of a solid-state imaging apparatus according to a second embodiment of the present invention;

FIGS. 7A to 7E show the structure of a pixel of an FIT-CCD and the potential, helping explain a clipping operation in the second embodiment;

FIG. 10 is a timing chart to help explain the operation of a solid-state imaging apparatus according to a fifth embodiment of the present invention.

DETAILED DESCRIPTION OF THE PREFERRED EMBODIMENTS

Figure 1:
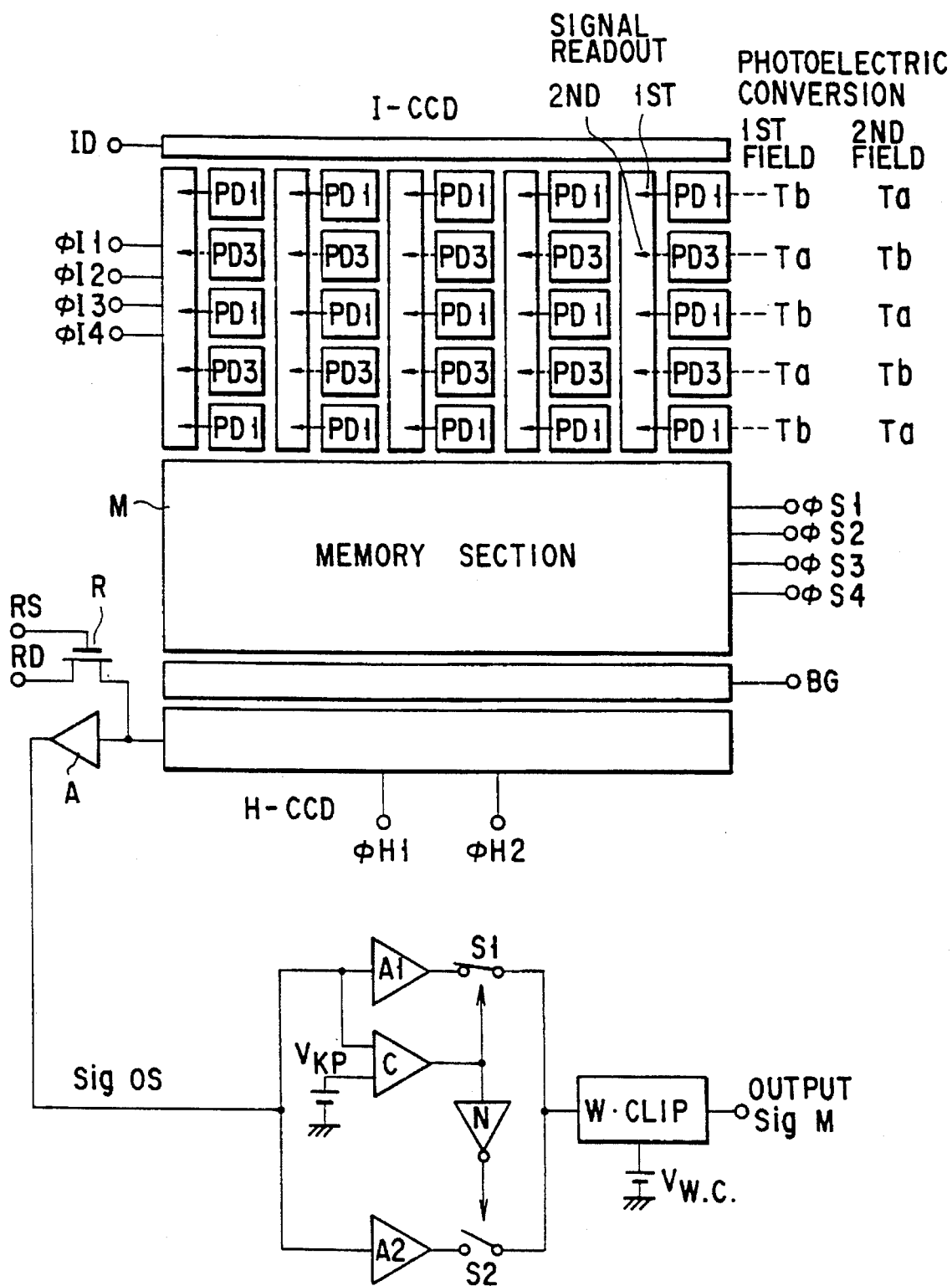
FIG. 1 is a schematic diagram of a solid-state imaging apparatus according to a first embodiment of the present invention.

In a first embodiment of the present invention of FIG. 1, a solid-state imaging device comprises an FIT-CCD, which comprises photosensitive pixels PD, a vertical CCD (I-CCD) acting as a signal charge transfer portion, a memory portion (M) for one field period, a drain (ID) for drawing off signal charges, an isolating gate (BG gate) between the memory portion (M) and a horizontal CCD (H-CCD), an output signal reset transistor (R), and an on-chip amplifier (A) connected to the output terminal of the horizontal CCD (H-CCD).

A signal processing circuit (signal reproduction circuit) for the output signal SigOS of the FIT-CCD comprises amplifiers A1 and A2 whose amplification degrees differ from each other, switches S1 and S2 for switching between the outputs of the amplifiers A1 and A2 to provide a single signal, a comparator C for sensing a specified level of the input signal SigOS, an inverter N for inverting the output signal of the comparator C, and a white clipping circuit (W. CLIP) for clipping the output signal SigM at a high level.

The solid-state imaging device is driven by four-phase driving pulses (ø I1 to ø I4). The memory portion M is also driven by four-phase driving pulses (ø S1 to ø S4). The horizontal CCD H-CCD is driven by two-phase pulses (ø H1 and ø H2). These driving pulses are supplied from a driving circuit (not shown).

In the FIT-CCD, the signal charges accumulated in the photosensitive pixels PD during photoelectric conversion times Ta and Tb are transferred to the vertical CCD (I-CCD) by a first signal read and a second signal read. In a first field, the photoelectric conversion time of photosensitive pixels PD1 is period Tb and that of pixels PD3 is period Ta. In a second field, the photoelectric conversion time of pixels PD1 is period Ta and that of pixels PD3 is period Tb. During these conversion times, the signal charges are accumulated.

Operation sequence (I) of the FIT-CCD in the embodiment is shown in FIG. 2. In FIG. 2, reference characters VBL indicates a blanking signal, ø I1 and ø I3 represent pulses applied to the electrodes serving as the gate that transfers the signals from the photosensitive pixels PD1 to PD3 in the FIT-CCD (imaging portion) to the vertical CCD (I-CCD) and the transfer gate for four-phase driving of the vertical CCD (I-CCD), and $Q_{PD1}$ and $Q_{PD3}$ denote the amount of signal charges on the photosensitive pixels PD1 and PD3, respectively.

The signal charges Q accumulated on pixel PD1 during the first field period are read into the I-CCD by pulse P11 of the pulse signal ø I1. Then, they are discharged from the ID portion of the FIT-CCD by a high-speed transfer discharge pulse SO. Thus, charges Qb used as a signal are accumulated only during period Tb between pulses P11 and P12. Signal charges Qa on pixel PD3 are accumulated during period Ta between pulses P32 and P33 of pulse signal ø I3.

Figure 5A:
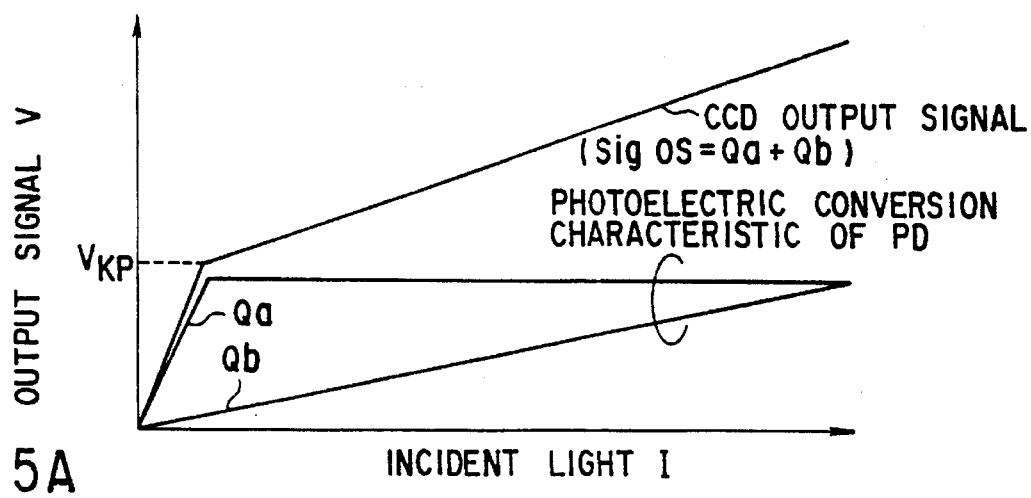
FIGS. 5A and 5B are photoelectric conversion characteristic diagrams (the characteristics showing the change of signal with respect to the light input) for the operation of the signal reproduction circuit in the first embodiment.

By pulses P12 and P33, the accumulated charges are read into the vertical CCD (I-CCD), which adds them together. Then, the added charge is transferred to the memory section M by a high-speed frame transfer pulse FT, from which the charge is are sent to the horizontal CCD, which outputs it. The output signal SigOS of the horizontal CCD is a signal obtained by adding charges Qa and Qb. This signal is shown in FIG. 5A.

In contrast with the first field, in the second field, signal Qa is accumulated on pixel PD1 during period Ta, and signal Qb is accumulated on pixel PD3 during period Tb. These operations give different weights to pixels PD1 and PD3, providing the advantage of improving the vertical resolution.

Pulse signals ø I1 and ø I3 are set to level $V_{FS}$ so that signal charges Qa and Qb on pixels PD1 and PD3 may be clipped at level Qkp. At small signal levels equal to or lower than level Qkp, the photoelectric conversion time gets longer as indicated by time Ta, producing a signal charge Qa with a good signal-to-noise ratio. Moreover, for large signals whose level is equal to or higher than level Qkp at which the charge Qa is clipped, a signal of charge Qb which is obtained during time Tb and has a good motion resolution is available. By adding these signal charges (Qa and Qb) to produce an output signal, a signal with a good motion resolution and no deterioration of signal-to-noise ratio can be obtained.

Hereinafter, the clipping operation will be explained in detail. FIG. 3A is a sectional view of pixels of the FIT-CCD, and FIG. 3B to 3E show the mechanism of charge transfers in the FIT-CCD. In FIG. 3A, the n-type photosensitive pixels PD1 and PD3 and the transfer n-type CCD are formed in a p-type substrate. The signal read electrodes of the photosensitive pixels PD1 and PD3 each are formed by a polysilicon electrode serving as both a transfer electrode in the vertical CCD (I-CCD) and an electrode for pulse signals ø I1 and ø I3.

The state of signal charges accumulated on photosensitive pixels PD1 and PD3 at time t3 in the first field is shown in FIG. 3B. The signal charges overflowed from the photosensitive pixels PD flow into the vertical CCD (I-CCD). At time t4 in FIG. 3C, the signal charges accumulated in the pixels PD1 are read into the vertical CCD (I-CCD) by applying voltage $V_{FS}$ to the electrode of pulse signal ø I1 to place the potential at ø $_{FS}$ level. The signal charges Q overflowed from the pixels PD3 flow into the vertical CCD (I-CCD) as in FIG. 3B. Namely, large signal charges are clipped. This level can be controlled by controlling the voltage level $V_H$ or $V_{FS}$ of pulse signals ø I1 and ø I3 and by changing potential ø H or ø $_{FS}$.

At time t5 in FIG. 3D, the signal charges are released from the vertical CCD (I-CCD) and signal charge Qb obtained by a short photoelectric conversion time is accumulated in the pixels PD1. At time t6 in FIG. 3E, voltage $V_{FS}$ (potential ø $_{FS}$) is applied to the gate of pulse signals ø I1 and ø I3 to read these signals into the vertical CCD (I-CCD). This operation enables the pixels PD1 to produce signal charge Qb obtained by the short photoelectric conversion time, and the pixels PD3 to produce large signal charge Qa obtained by a long photoelectric conversion time are clipped. Since the clipping signal level is limited by potential ø $_{FS}$–ø H, either ø $_{FS}$ or ø H may be controlled.

FIG. 4 shows potential ø in the vertical CCD (I-CCD) and the signal charges Q converted photoelectrically by the photosensitive pixels PD. During the first field period, the light signal during period Tb is photoelectrically converted by photosensitive pixel PD1 and then Qb is accumulated. At photosensitive pixels PD3, the light signal during period Ta is converted photoelectrically and then signal charge Qa is accumulated.

At time t1, read voltage $V_{FS}$ is applied to the electrode of pulse signals ø I1 and ø I3 to read signal charges Qa and Qb into the vertical CCD (I-CCD). At this time, pulse signals ø I2 and ø I4 are set at level ø L. Next, at time t2, pulse signals ø I3, ø I4, and ø I1 are placed at level ø H and then the addition of signal charges Qa+Qb is effected at the vertical CCD (I-CCD). Thereafter, the added charge is transferred to the memory portion by high-speed FT pulses (four phase pulses of ø I1, ø I2, ø I3, and ø I4). Then, it passes through the horizontal CCD during the second field period, and is converted into a voltage by an output amplifier A, which outputs the voltage.

In photoelectric conversion during the second field period, the photoelectric conversion time of photosensitive pixel PD1 is period Ta and that of pixel PD3 is period Tb. During these periods, signal charges Qa and Qb are accumulated on pixels PD1 and PD3, respectively. At time t1, signal charges Qa and Qb are read into the vertical CCD (I-CCD) as in the first field. At time t2, differently from the first field, pulse signals ø I1, ø I2, and ø I3 are placed at level ø H and pulse signal ø I4 is put at level ø L. Then, signal charge Qa+Qb on a photosensitive pixel different from that in the first field is obtained.

As a result, the output signal of the CCD is a signal obtained by adding Qa to Qb shown in FIG. 5A. The portion whose level is Vkp or below of the output signal SigOS is made up of charge Qa+Qb components and that whose level is Vkp or above is composed of charge Qb components.

Next, the operation of the signal processing circuit (signal reproduction circuit) of the output signal SigOS of the FIT-CCD will be described. As shown in FIG. 1, this circuit comprises amplifiers A1 and A2 which amplify the input signal SigOS from amplifier A and whose amplification degrees differ from each other, a white clipping circuit (W. CLIP) connected to the output terminals of amplifiers A1 and A2 via switches S1 and S2 respectively, a comparator C for comparing the input signal SigOS from amplifier A with a reference voltage Vkp, and an inverter N for inverting the output signal of the comparator C.

When the input signal SigOS is lower than level Vkp, the output of comparator C goes high, turning on switch S1. At this time, the output of inverter N goes low, turning off switch S2. At this time, the output signal SigM is: SigM= SigOS×a1 (the amplification degree of amplifier A1).

When the input signal SigOS is higher than level Vkp, the output of the comparator C goes low, turning off switch S1. On the other hand, the output of inverter N goes high, turning on switch S2. At this time, the output signal SigM is: SigM=SigOS×a2 (the amplification degree of amplifier A2). When the output signal SigM becomes too large, the white clipper circuit (W. CLIP) clips a part of the signal whose level is equal to or higher than level Vw.c. Switches 51 and 52 may be operated on the input sides of the amplifiers A1 and A2.

Figure 5B:
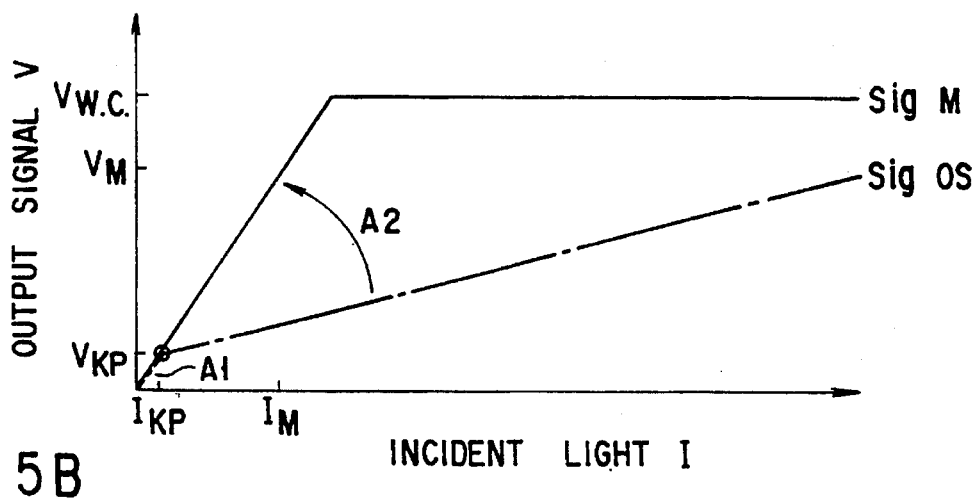

The photoelectric conversion characteristics (the characteristics showing the change of signal with respect to the light input) of the operation of the signal reproduction circuit is shown in FIG. 5B. Increasing the amplification degree at clipping level Vkp or above raises the amplification degree for signals obtained by a short photoelectric conversion time, increasing the slope of the output signal with respect to the incident light.

Because the output signal SigOS of the FIT-CCD is obtained by adding signals (Qa+Qb) obtained by photoelectric conversion times different from each other, it has a slope level at incident light level Ikp or above. For the output signal SigM of the signal processing circuit, the amplification degrees of amplifiers A1 and A2 are determined to be a2>a1, and are switched at level Vkp, thereby producing an output signal SigM with no slope level at point Vkp. A high-level output signal SigM is clipped at level Vw.c.

The output signal SigM whose level is equal to or higher than level Vkp is a component of signal Qb obtained by a short photoelectric conversion time, producing a signal with a good motion resolution. The output signal SigM whose level is equal to or lower than level Vkp is a component of signal Qa obtained by a long photoelectric conversion time, producing a signal with no deterioration of the signal-to-noise ratio of a signal whose level is equal to or lower than level Vkp. If the clipping level Vkp is set at a larger value than conspicuous noise components in the reproduced image on the monitor, the noise which increases as the amplification degree increases at clipping level Vkp or above can be rendered unnoticeable.

In general, on the reproduced image displayed by the monitor, the noise contained in a signal having a low signal level of 10% or less is nearly 10 times as easy to sense as the noise contained in a signal having a 100% signal level. To make use of this feature, for example, the photoelectric conversion time for obtaining signals having a signal level of 10% or less is made longer than 1/60 sec, producing a signal with less noise, and the photoelectric conversion signals having a signal level of 10% or more is determined to be 1/10 (1/600 sec), producing a signal with a good motion resolution. By setting point Vkp to 10% of the level of the reference signal M at the signal reproduction circuit, the signal can be displayed on the monitor with the amplification degree for signals of a signal level of 10% or more being ten times as large as that for signals of a signal level of 10% or less, thereby producing a signal with a good motion resolution and no deterioration of the signal-to-noise ratio.

As described above, with the present embodiment, a monitor reproduced image with a good motion resolution and no deterioration of the signal-to-noise ratio is achieved by the technique for driving the imaging device with different photoelectric conversion times for low and high signal levels, making use of the feature of the system, and by using the signal reproduction circuit that increases the amplification degree for high-level signals (signals obtained by a short photoelectric conversion time).

Hereinafter, a second embodiment of the present invention will be described. The basic circuit configuration is the same as that of FIG. 1 except that the operation method of the imaging device in the second embodiment differs from that in the first embodiment. Operation sequence (II) of the imaging device in the second embodiment will be shown in FIG. 6. By this method, the amount of signals (both Qa and Qb) can be made twice as large as that in operation sequence (I).

At pixel PD1, pulse P11 of pulse signal ø I1 is set to level $V_{FS1}$ and pulse P12 to level $V_{FS2}$ so that both signal Qa1 with photoelectric conversion time Ta and signal Qb1 with photoelectric conversion time Tb may be obtained. Similarly, at pixel PD3, too, pulse P31 of pulse signal ø I3 is set to level $V_{FS1}$ and pulse P32 to level $V_{FS2}$, thereby producing signal charges Qa3 and Qb3. In the vertical CCD (I-CCD), charges Qa1, Qb1, Qa3, and Qb3 are added together as in FIG. 4, and a charge of Qa+Qb is obtained as FIF-CCD output signal SigOS. Charge Qa (Qa1+Qa3) is a signal accumulated as long as one field period, and charge Qb (Qb1+Qb3) is a signal obtained from an electronic shutter operation during period Tb.

The clipping signal level Vkp of charge Qa sets pulses P11 and P31 to level $V_{FS1}$ of voltage. Signal charges larger than charge Qkp are read with read voltage $V_{FS2}$ higher than voltage $V_{FS1}$. For the output SigOS of the FIT-CCD, signal charge Qa smaller than charge Qkp is a signal accumulated during one field period with a good signal-to-noise ratio, and signal charge Qb higher than charge Qkp is a signal with a good motion resolution obtained from an electronic shutter operation during period Tb.

FIG. 7A is a sectional view of the pixels of the FIT-CCD, and FIGS. 7B to 7E show a mechanism of charge transfer in the FIT-CCD. The structure in FIG. 7A is the same as in FIG. 3A.

At time t1 in FIG. 7B, the signal charge converted photoelectrically by a photosensitive pixel PD is accumulated. At time t2 in FIG. 7C, voltage $V_{FS1}$ (potential ø $_{FS1}$) is applied to the read gate of the vertical CCD (I-CCD) (ø I1 and ø I3) to read signal charges higher than ø $_{FS1}$ into the vertical CCD (I-CCD). Namely, signal charge Qa is the charge obtained by clipping the signal charge equal to or larger than ø $_{FS1}$.

At time t3 in FIG. 7D, signal charge Qb obtained by a short photoelectric conversion time is accumulated in the pixel PD. Furthermore, at time t4 in FIG. 7E, voltage $V_{FS2}$ (potential ø $_{FS2}$) is applied to the read gate of the vertical CCD (I-CCD) (ø I1 and ø I3) to read signal charge of Qa+Qb into the vertical CCD (I-CCD). The signal processing in this embodiment is performed by the manner similar to the first embodiment.

Figure 8:
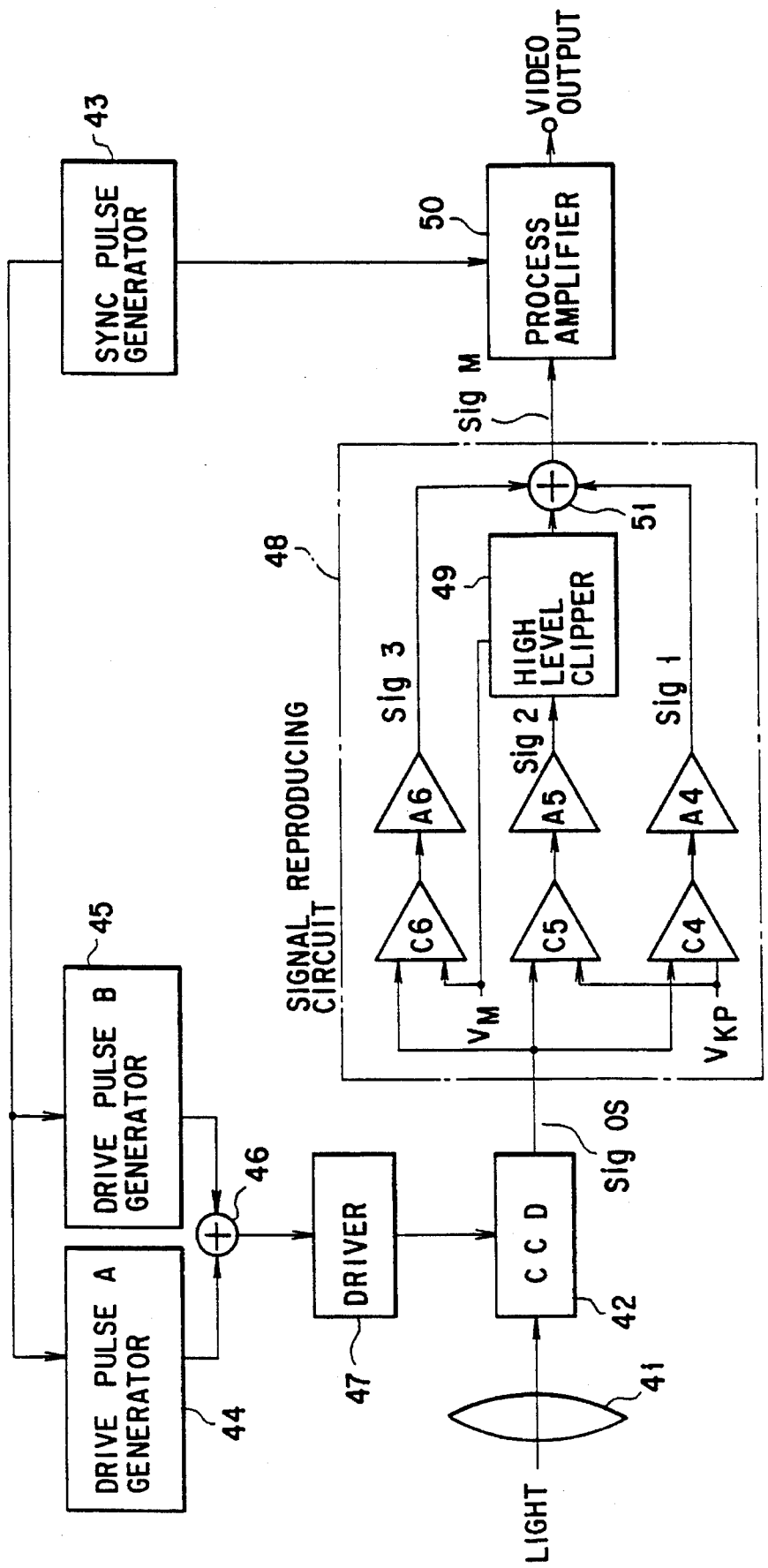
FIG. 8 is a block diagram of a solid-state imaging apparatus according to a third embodiment of the present invention.

FIG. 8 is a block diagram of a solid-state imaging apparatus according to a third embodiment of the present invention. This apparatus comprises a lens 41 for condensing an incident light, an FIT-CCD 42 for photoelectrically converting the incident light (optical image) passed through the lens 41, a camera synchronizing pulse generator 43 for generating synchronizing pulses, a CCD-driving pulse B generator 44 that, receiving the synchronizing pulse from the camera synchronizing pulse generator 43, generates driving pulses A, a pulse B generator 45 that, receiving the synchronizing pulse from the camera synchronizing pulse generator circuit 43, generates driving pulses A, a driving pulse mixing circuit 46 for combining the driving pulses A and B from the driving pulse A generator 44 and driving pulse B generator 45, a CCD driver 47 for driving the CCD 42 according to the mixed pulse from the driving pulse mixing circuit 46, a signal reproduction circuit 48 for processing the output signal of the CCD 42, and a process circuit 50 for processing the signal from the signal reproduction circuit 48.

In the solid-state imaging apparatus thus constructed, CCD 42 is similar to that of the first embodiment. The signal photoelectric conversion times Ta and Tb of photosensitive pixels PD1 and PD3 are controlled by the driving pulse A generator (photoelectric conversion time Ta) 44 and the driving pulse B generator (photoelectric conversion time Tb) 45, respectively. The output pulses from the driving pulse A generator 44 and the driving pulse B generator 45 are mixed with each other by the pulse mixing circuit 46. According to the mixed pulse signal, the driver 47 drives the CCD 42.

The output signal SigOS of the CCD 42 is divided by level slicers C4, C5, and C6 into three signals, which are amplified by amplifiers A4, A5, and A6, respectively, whose amplification degrees differ from each other. The output signals Sig1, Sig2, and Sig3 amplified by amplifiers A4, A5, and A6 respectively are added together at an adder circuit 51. The added signal is supplied as signal SigM from the signal reproduction circuit 48 to the process amplifier 50. At this time, the high-level portion of the signal Sig2 is clipped by the high-level clipper 49. The output signal of the signal reproduction circuit 48 undergoes black level setting, γ correction, and a BLK process at the process amplifier 50, thereby producing a video signal.

Figure 9:
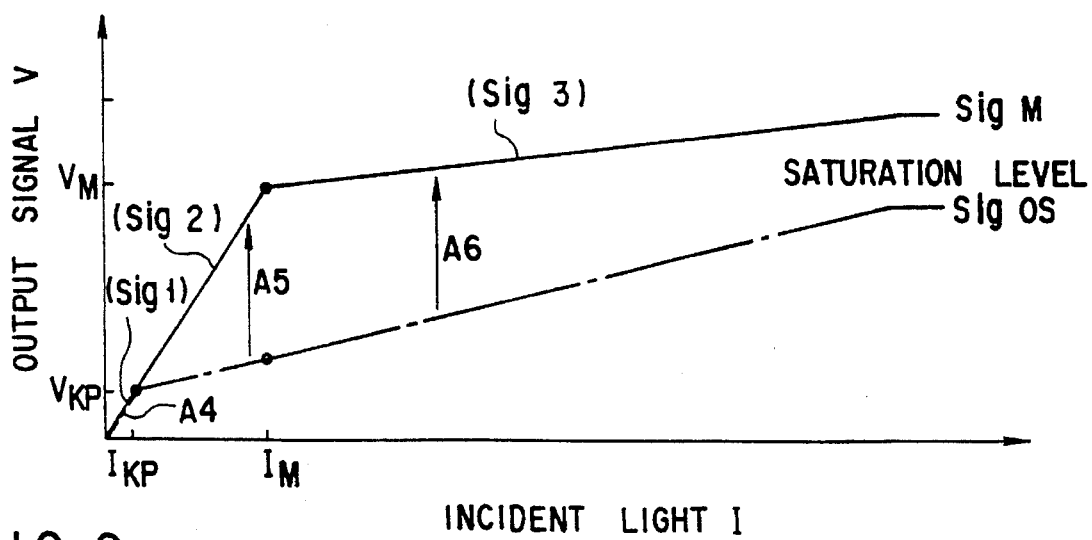
FIG. 9 is a photoelectric conversion characteristic diagram of the input signal $Sig_{OS}$ and the output signal $Sig_M$ of the signal reproduction circuit in a fourth embodiment of the present invention.

The photoelectric conversion characteristics of the input signal SigOS versus the output signal SigM in the signal reproduction circuit 48 is shown in FIG. 9. In the signal SigOS, a signal of Vkp or below has a long photoelectric conversion time and a good signal-to-noise ratio, and a signal having a level higher than Vkp has a short photoelectric conversion time and a good motion resolution. The difference in the photoelectric conversion time provides signal SigOS with a slope with respect to the incident light level at point Vkp (a knee characteristic). The operation has the advantage that the amount of saturated input light increases from IM1 to IM2. In the prior art, the amount of saturated light was IM1.

The signal reproduction circuit 48 separates the input signal into signal Sig1 equal to or lower than point Ikp in the amount of incident light, signal Sig2 in the range of Ikp to IM1, and signal Sig3 equal to or higher than IM1, which are processed separately. When a reference video output signal (700 mVp-p, 100%) level is VM, the signal corresponding to incident light levels 0 to IM1 is obtained. The gain of amplifiers A4 and A5 is adjusted so that the level slope of the output from the signal reproduction circuit may vary linearly. The gain of amplifier A6 is set so that the level of signal Sig3 can be compressed with a slope starting at point VM so as to allow reproduction on the monitor.

With the driving technique and the signal reproduction circuit, a high motion resolution signal with no deterioration of the signal-to-noise ratio on the monitor reproduced image can be obtained by using small signal levels (equal to or lower than point Vkp) where noise is easy to sense as the components of signal Qa with a good signal-to-noise ratio, and using large signal levels (equal to or higher than point Vkp) where noise is relatively hard to sense as the components of signal Qb with high motion resolution.

Hereinafter, a fourth embodiment of the present invention will be described. The basic circuit configuration is the same as that of FIG. 1 except that the operation method of the imaging device in this embodiment differs from that of FIG. 1. Operation sequence (III) of the imaging device in the embodiment is shown in FIG. 10.

In this method, photoelectric conversion time Ta of a photosensitive pixel whose photoelectric conversion time is long is determined to be one frame (two field) period, thereby producing a signal with a good signal-to-noise ratio. For photosensitive pixels whose photoelectric conversion time is short, photoelectric conversion time Tb is determined to be one field period, producing signal Qb. By using this method, the signal-to-noise ratio can be improved without degrading the motion resolution.

The present invention is not limited to the embodiments described above. While in the embodiments, the interlace scanning imaging system where the photosensitive pixels are added together in the vertical direction has been explained, the invention may be applied to a probeless scanning imaging system where the signals of all of the photosensitive pixels are read one after another separately. Both shorter and longer photoelectric conversion times can be set to desired values. For example, the shorter photoelectric conversion time may be determined to be 1/30 sec and the longer one be 1/15 sec. Furthermore, the shorter photoelectric conversion time may be shorter than 1/60 sec. In addition, by using three or more different photoelectric conversion times, the motion resolution can be improved according to the signal level.

While in the embodiments, an analog processing system has been used, use of digital processing enables the signal reproduction operation to be effected more reliably, facilitating the operation according to the subject. Furthermore, the invention may be applied to a photoelectric conversion film laminated CCD obtained by laminating a photoelectric conversion film (e.g., amorphous silicon) on top of the CCD. While in the embodiments, an FIT-CCD has been used, the invention is not limited to the FIT-CCD, but may be applied to an IT-CCD.

As has been explained in detail, with the present invention, the motion resolution in shooting a moving subject can be improved without degrading the signal-to-noise ratio by driving the photoelectric pixels with different photoelectric conversion times between low and high signal levels and by using a signal processing circuit which increases the amplification degree of signals whose level is higher than a specific high signal level (signals obtained by a short photoelectric conversion time). Namely, it is possible to improve the motion resolution without degrading the signal-to-noise ratio, thereby achieving a solid-state imaging device that produces high-quality reproduced images.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A solid-state imaging apparatus comprising:

a solid-sate imaging device including a plurality of photosensitive pixels arranged in a matrix on a semiconductor substrate;

a driving circuit for driving said photosensitive pixels of said solid-state imaging device during a first photoelectric conversion time period and a second photoelectric conversion time period which is defined within, is shorter than, and occurs simultaneously with the same first photoelectric conversion time period, to obtain a first signal corresponding to the first photoelectric conversion time period and a second signal corresponding to the second photoelectric conversion time period, said driving circuit including means for clipping the first signal at a specified level or above, and adding the signal obtained from the clipping to the second signal to produce an added signal; and a signal processing circuit for amplifying the added signal from said adding means so as to amplify the second signal at an amplification degree larger than that for the first signal, and outputting the amplified signal.

2. A solid-state imaging apparatus according to claim 1, wherein said photosensitive pixels contain a plurality of first photosensitive pixels and a plurality of second photosensitive pixels arranged alternately, and said driving circuit drives said first photosensitive pixels during said first photoelectric conversion time period and said second photosensitive pixels during said second photoelectric conversion time period, to obtain the first signal from said first photosensitive pixels and the second signal from said second photosensitive pixels, the first photoelectric conversion time period corresponding to a period of one of at least one field and at least one frame.

3. A solid-state imaging apparatus according to claim 1, wherein said photosensitive pixels contain a plurality of first photosensitive pixels and a plurality of second photosensitive pixels arranged alternately, and said driving circuit drives said first and second photosensitive pixels during the first and second photoelectric conversion time periods for each field to obtain the first and second signals corresponding to the first photosensitive pixels and the first and second signals corresponding to the second photosensitive pixels, and said driving circuit adds the first and second signals corresponding to the first photosensitive pixels together to obtain a first added signal and the first and second signals corresponding to the second photosensitive pixels together to obtain a second added signal, and further adds the first and second added signals together to obtain a sum signal which is supplied to said signal processing circuit.

4. A solid-state imaging apparatus according to claim 1, wherein said signal processing circuit comprises first and second amplifiers which receive the added signal and whose amplification degrees differ from each other, first and second switches connected to the output terminals of said first and second amplifiers respectively, a comparator for comparing said added signal with a reference voltage, and means for selectively performing on/off control of said first and second switches according to the output signal of said comparator.

5. A solid-state imaging apparatus according to claim 4, further comprising a clipper for clipping the added signal selectively passed through said first and second switches at a specified level or above.

6. A solid-state imaging apparatus comprising:

a solid-sate imaging device including a plurality of photosensitive pixels arranged in a matrix on a semiconductor substrate;

a driving circuit for driving said photosensitive pixels of said solid-state imaging device during a first photoelectric conversion time period and a second photoelectric conversion time period which is defined within, is shorter than, and occurs simultaneously with the same first photoelectric conversion time period to obtain a first signal corresponding to the first photoelectric conversion time period and a second signal corresponding to the second photoelectric conversion time period, said driving circuit including means for clipping the first signal at a specified level or above, and adding the signal obtained from the clipping to the second signal to produce an added signal; and a signal processing circuit including means for setting at least one of a plurality of amplification degrees for the second signal larger than that for the first signal so that the amplification degree may decrease consecutively as the level of the added signal increases, and means for amplifying the added signal from said adding means so as to amplify the second signal at one of the amplification degrees larger than that for the first signal, and outputting the amplified signal.

7. A solid-state imaging apparatus according to claim 6, wherein said photosensitive pixels contain a plurality of first photosensitive pixels and a plurality of second photosensitive pixels arranged alternately, and said driving circuit drives said first photosensitive pixels during said first photoelectric conversion time period and said second photosensitive pixels during said second photoelectric conversion time period, to obtain the first signal from said first photosensitive pixels and the second signal from said second photosensitive pixels, the first photoelectric conversion time period corresponding to a period of one field and the second photoelectric conversion time period corresponding to a period shorter than the period of one field.

8. A solid-state imaging apparatus according to claim 6, wherein said photosensitive pixels contain a plurality of first and second photosensitive pixels arranged alternately, and said driving circuit drives said first and second photosensitive pixels during the first and second photoelectric conversion times for each field.

9. A camera apparatus comprising:

a lens for condensing an incident light to form an optical image;

a solid-state imaging device which includes a plurality of photosensitive pixels arranged in a matrix on a semiconductor substrate and which photoelectrically convert the optical image projected thereon from said lens;

a synchronizing pulse generating circuit for generating synchronizing pulses;

a driving pulse generating circuit which receives the synchronizing pulses from said synchronizing pulse generating circuit, and generates a first and a second pulse signal for determining a first photoelectric conversion time period and a second photoelectric conversion time period which is defined within, is shorter than, and occurs simultaneously with the same first photoelectric conversion time period, respectively;

a driving circuit for driving said solid-state imaging device according to the first and second pulse signals, said driving circuit driving the photosensitive pixels of said solid-state imaging device during the first and second photoelectric conversion time periods to obtain first and second signals therefrom, the first signal being obtained by the photosensitive pixels during the first photoelectric conversion time and the second signal being obtained by the photosensitive pixels during the second photoelectric conversion time period, said driving circuit including means for clipping the first signal at a specified level or above, and adding the signal obtained from the clipping to the second signal to produce an added signal; and a signal processing circuit including means for setting an amplification degree for the second signal to a value larger than that for the first signal, and amplifying the added signal from said adding means so as to amplify the second signal at the amplification degree larger than that for the first signal, to obtain a video signal.

10. A camera apparatus according to claim 9, wherein said signal processing circuit includes means for setting at least one of a plurality of amplification degrees for the second signal to a value larger than that for said first signal so that the amplification degree may decrease consecutively as the level of the added signal increases.

11. A camera apparatus according to claim 9, wherein said signal processing circuit comprises a plurality of level slicing circuits for dividing the added signal into a plurality of divided signals, and a plurality of amplifiers for amplifying the divided signals and outputting a plurality of amplified signals, respectively, a clipper for clipping one of said amplified signals to obtained a clipped signal, an adder for adding the other ones of the amplified signals and the clipped signal to one another and outputting a second added signal, and a signal processor for processing the second added signal to obtain the video signal.

12. A solid-state imaging apparatus comprising:

a solid-state imaging device including a plurality of photosensitive pixels arranged in a matrix on a semiconductor substrate;

a driving circuit for driving said photosensitive pixels of said solid-state imaging device during a first photoelectric conversion time period and a second photoelectric conversion time period which is defined within, is shorter than, and occurs simultaneously with the same first photoelectric conversion time period, to obtain a first signal and a second signal, the first signal obtained during the first photoelectric conversion time period and the second signal obtained during the second photoelectric conversion time period; and a signal processing circuit including means for amplifying the first and second signals at a first amplification degree and a second amplification degree larger than the first amplification degree, respectively, to output a first amplified signal and a second amplified signal and means for adding the first amplified signal to the second amplified signal to output an added signal as an output signal.

13. A solid-state imaging apparatus according to claim 12, wherein said driving circuit drives said photosensitive pixels during the first photoelectric conversion time period corresponding to a period of one of at least one field and at least one frame and the second photoelectric conversion time period.

14. A solid-state imaging apparatus according to claim 13, wherein said photosensitive pixels contain a plurality of first photosensitive pixels and a plurality of second photosensitive pixels arranged alternately, and said driving circuit drives said first and second photosensitive pixels during the first and second photoelectric conversion time periods to obtain first and second combined signals obtained by combining the first and second signals corresponding to each of the first photosensitive pixels with the first and second signals corresponding to each of the second photosensitive pixels, and said amplifying means of said signal processing circuit amplifies the first and second combined signals at the first and second amplification degrees respectively, and said adding means thereof adds the first and second amplified signals to output the added signal as the output signal.

15. A solid-state imaging apparatus according to claim 12, wherein said driving circuit includes means for supplying to said solid-state imaging device a drive pulse signal for clipping the first signal during the first photoelectric conversion time period and obtaining the second signal during the second photoelectric conversion time period.

16. A solid-state imaging apparatus according to claim 12, wherein said signal processing circuit includes means for clipping a signal having a level higher than a predetermined level from the added signal.

17. A solid-state imaging apparatus according to claim 12, wherein said photosensitive pixels contain a plurality of first photosensitive pixels and a plurality of second photosensitive pixels arranged alternately, and said driving circuit drives each of said first photosensitive pixels and each of said second photosensitive pixels alternately during the first and second photoelectric conversion time periods for each frame, the first photoelectric conversion time period corresponding to two fields and the second photoelectric conversion time period corresponding to one field.

18. A solid-state imaging apparatus comprising:

a solid-state imaging device including a plurality of photosensitive pixels arranged in a matrix on a semiconductor substrate;

a driving circuit for driving said photosensitive pixels of said solid-state imaging device during a first photoelectric conversion time period and a second photoelectric conversion time period which is defined within, is shorter than, and occurs simultaneously with the same first photoelectric conversion time period, to obtain a first signal and a second signal, the first signal obtained during the first photoelectric conversion time period and the second signal obtained during the second photoelectric conversion time period; and a signal processing circuit including means for amplifying the first and second signals at a first amplification degree and a second amplification degree different from the first amplification degree, respectively, to output a first amplified signal and a second amplified signal and means for adding the first amplified signal to the second amplified signal to output an added signal as an output signal.

19. A camera apparatus comprising:

a lens for condensing an incident light to form an optical image;

a solid-state imaging device which includes a plurality of photosensitive pixels arranged in a matrix on a semiconductor substrate and which photoelectrically converts the optical image projected thereon from said lens;

a synchronizing pulse generating circuit for generating synchronizing pulses;

a driving pulse generating circuit which receives the synchronizing pulses from said synchronizing pulse generating circuit, and generates a first pulse signal and a second pulse signal for determining a first photoelectric conversion time period and a second photoelectric conversion time period which is defined within, is shorter than, and occurs simultaneously with the same first photoelectric conversion time period, respectively;

a driving circuit for driving said solid-state imaging device according to the first and second pulse signals, said driving circuit driving the photosensitive pixels of said solid-state imaging device during the first and second photoelectric conversion time periods to obtain first and second signals therefrom, the first signal being obtained by the photosensitive pixels during the first photoelectric conversion time and the second signal being obtained by the photosensitive pixels during the second photoelectric conversion time period; and a signal processing circuit including means for amplifying the first and second signals at a first amplification degree and a second amplification degree larger than the first amplification degree, respectively, to output a first amplified signal and a second amplified signal and means for adding the first amplified signal to the second amplified signal to output an added signal as a video signal.

* * * * *